United States Patent [19]

Ide et al.

[11] Patent Number: 5,492,582
[45] Date of Patent: Feb. 20, 1996

[54] METHOD OF MANUFACTURING LIQUID CRYSTAL DISPLAY DEVICE

[75] Inventors: Akihiko Ide, Hamura; Tetsuro Ueki, Hachioji, both of Japan

[73] Assignee: Casio Computer Co., Ltd., Tokyo, Japan

[21] Appl. No.: 229,829

[22] Filed: Apr. 19, 1994

[30] Foreign Application Priority Data

Apr. 22, 1993 [JP] Japan .................................. 5-117576
Apr. 22, 1993 [JP] Japan .................................. 5-117577
Apr. 22, 1993 [JP] Japan .................................. 5-117578

[51] Int. Cl.⁶ .................................................. C03C 27/00
[52] U.S. Cl. ........................ 156/106; 156/248; 156/267; 65/42; 65/56; 65/58; 65/112; 83/875; 83/24; 83/100; 83/152; 359/62; 359/80; 359/81; 359/82; 428/1
[58] Field of Search ............................. 65/42, 56, 58, 65/112; 83/861, 862, 863, 864, 869, 875, 876, 879, 22, 24, 98, 100, 168, 177, 152; 359/62, 80, 81, 82, 53; 156/248, 267, 268, 106; 428/1

[56] References Cited

U.S. PATENT DOCUMENTS

| | | | |
|---|---|---|---|
| 3,772,631 | 11/1973 | Owen | 338/195 |
| 4,868,978 | 9/1989 | Seidel et al. | 29/835 |
| 4,872,289 | 10/1989 | Yukawa et al. | 51/5 R |
| 4,878,992 | 11/1989 | Campanelli | 156/633 |
| 5,025,348 | 6/1991 | Suzuki et al. | 361/398 |
| 5,278,685 | 1/1994 | Iwamoto et al. | 359/82 |

FOREIGN PATENT DOCUMENTS

| | | | |
|---|---|---|---|
| 56-25713 | 3/1981 | Japan | 359/62 |
| 63-86531 | 4/1988 | Japan . | |

Primary Examiner—David L. Lacey
Assistant Examiner—Sean Vincent
Attorney, Agent, or Firm—Frishauf, Holtz, Goodman, Langer & Chick

[57] ABSTRACT

A method of manufacturing a liquid crystal display device, in which predetermined portions of two glass plates bonded to each other with a sealing member interposed therebetween and constituting the display device, can be cut without turning over the bonded two glass plates and without breaking necessary portions thereof. In the method of manufacturing the liquid crystal display device, first, an upper one of the bonded two glass plates is half cut from its upper surface with a blade, and unnecessary portions of the upper glass plate are removed by the use of a vacuum suction head. Thereafter, predetermined portions of exposed portions of a lower one of the bonded two glass plates are fully cut with the blade. In accordance with it, it is not necessary to turn over the the bonded two glass plates-to cut it into a plurality of units, and, therefore, a cutting process can be performed automatically. Further, since portions of the bonded two glass plates other than the unnecessary portions thereof are prevented from breakage, the yield of products can be increased.

9 Claims, 8 Drawing Sheets

METHOD OF MANUFACTURING LIQUID CRYSTAL DISPLAY DEVICE

BACKGROUND OF THE INVENTION

1. Field of the Invention

This invention relates to a method of manufacturing a liquid crystal display device.

2. Description of the Related Art

There is such a liquid crystal display device that has a structure in which two glass substrates are bonded to each other with a sealing member interposed therebetween. Each of the glass substrates has a transparent electrode formed on a surface opposed to the other substrate, and liquid crystal is filled in a space located between the glass plates and surrounded by the sealing member. In a method of manufacturing the above described device, two glass plates for forming a plurality of liquid crystal display devices are prepared, the two glass plates are bonded to each other after performing predetermined pretreatments such as forming of transparent electrodes and forming of a sealing member. The bonded glass plates are cut into a plurality of units for a plurality of liquid crystal display devices before or after injecting liquid crystal between the glass plates of each unit.

A manner of cutting the two glass plates in the above-described conventional manufacturing method will be explained with reference to FIG. 8.

At first, as shown in FIG. 8A, two glass plates 1 and 2 are bonded to each other with a plurality of sealing members 3 interposed therebetween, and a liquid crystal 4 is sealed in a plurality of spaces located between the glass plates 1 and 2 and surrounded by the sealing members 3. Thereafter, marking lines 1a are scribed with the use of a wheel (not shown) in an outer surface of one of the glass plates 1, 2 which is located on the upper side. Then, as is shown in FIG. 8B, the bonded glass plates 1 and 2 are manually turned over, and a shock is applied to the glass plates 1 and 2 from upward of the upwardly located glass plate 2 so as to produce a stress in the marking lines 1a of the downwardly located glass plate 1, thereby cutting the glass plate 1 along the marking lines 1a. Subsequently, as is shown in FIG. 8C, marking lines 2a are scribed in an outer surface of the upwardly located glass plate 2, and the glass plates 1 and 2 are manually turned over. Then, a shock is applied to the glass plates 1 and 2 from upward of the upwardly located glass plate 1 so as to produce a stress in the marking lines 2a of the downwardly located glass plate 2, thereby cutting the glass plate 2 along the marking lines 2a as shown in FIG. 8D. Then, as is shown in FIG. 8E, portions of the glass plate 2 which correspond to terminal portions 5 of the glass plate 1 are removed so that a plurality of liquid crystal cells 6 are obtained.

As described above, in the conventional glass-cutting method, it is necessary to manually turn over the glass plates 1 and 2 twice. Thus, the conventional method requires troublesome manual turn over operations which increase a manufacturing cost of the liquid crystal display device. Further, since a shock is applied to both the glass plates 1 and 2 from upward of the upwardly located glass plate so as to produce a stress in the marking lines of the downwardly located glass plate, those portions of the downwardly located glass plate which are other than the marking lines may be broken, or the upwardly located glass plate may be broken unintentionally, so that the yield of products is reduced.

SUMMARY OF THE INVENTION

This invention is derived from the above-described circumstances, and an object of this invention is to provide a method of manufacturing a liquid crystal display device, in which bonded two glass plates for constituting a liquid crystal display device can be cut into a plurality of units for a plurality of liquid crystal display devices without turning over the both bonded glass plates twice and without breaking unintentional portions of the both bonded glass plates.

To achieve the above described object, there is provided a method of manufacturing a liquid crystal display device, comprising the steps of:

arranging two substrates to oppose to each other, and bonding the substrates with a sealing member interposed therebetween;

injecting liquid crystal into a space located between the substrates and surrounded by the sealing member;

forming half cut lines in a plurality of predetermined portions of at least one of the substrates;

cutting the at least one of the substrates along the half cut lines formed therein, thereby separating portions of the at least one of the substrate therefrom; and removing the separated portions, and exposing portions of the other substrate which correspond to the separated portions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

FIGS. 1–4 show steps of cutting two glass plates, which are used in a method of manufacturing a liquid crystal display device, according to an embodiment of the invention. The glass cutting method according to the embodiment will be explained with reference to FIGS. 1–4.

Figure 1A:
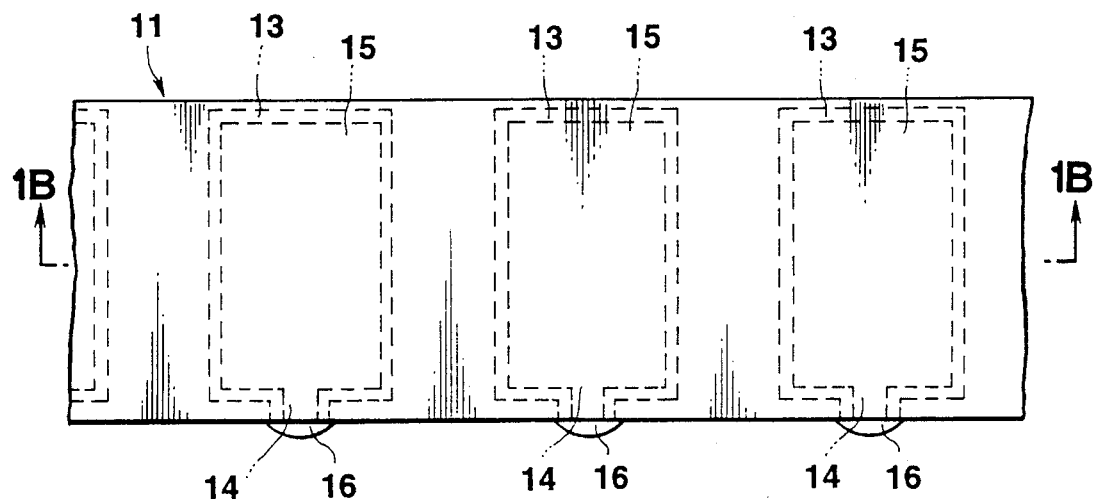
FIG. 1A is a plan view of bonded two glass plates.
Figure 1B:
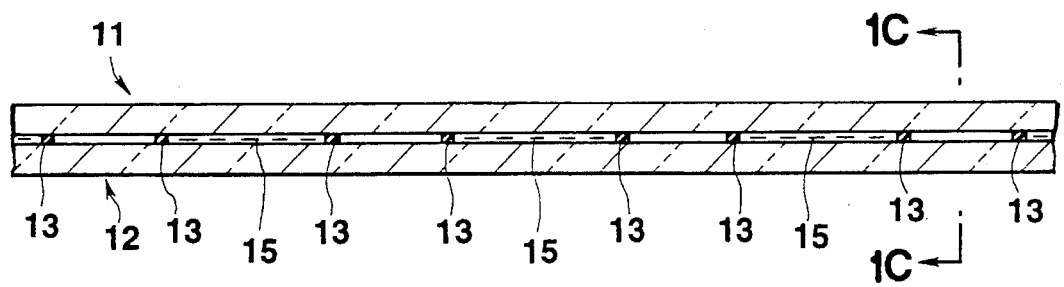
FIG. 1B is a cross sectional view of the bonded glass plates, taken along a line 1B—1B of FIG. 1A.
Figure 1C:
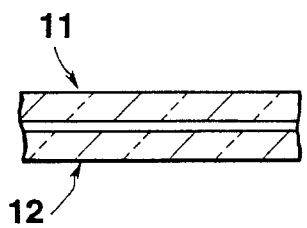
FIG. 1C is a cross sectional view of the bonded glass plates, taken along a line 1C—1C of FIG. 1B.

Referring first to FIGS. 1A–1C, two glass plates 11 and 12 each having a thickness of 0.3 mm– 1.5 mm are arranged to oppose to each other, and then bonded to each other with a plurality of sealing members 13 interposed therebetween. Then, a liquid crystal 15 is injected in spaces located between the glass plates 11 and 12 and surrounded by the sealing members 13, through liquid crystal injection ports 14 formed in the sealing members 13, and the injection ports 14 are sealed by other sealing members 16.

Figure 2A:
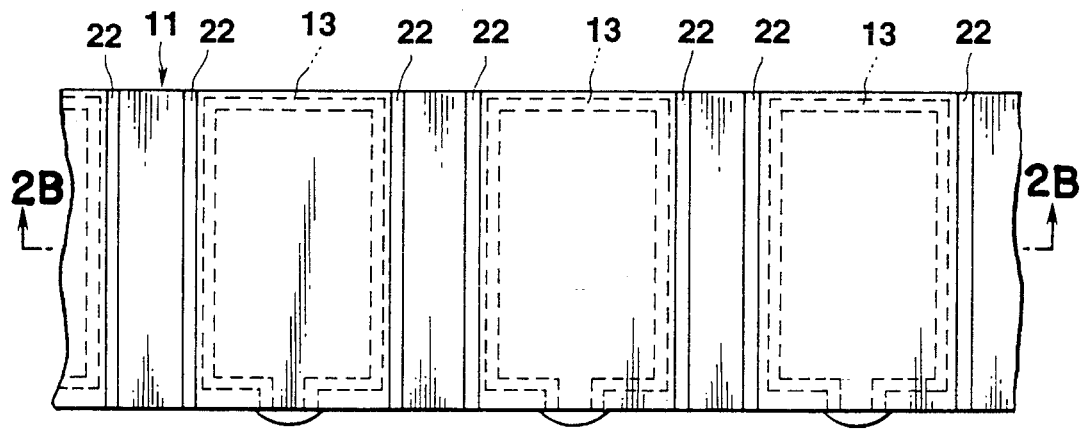
FIG. 2A is a plan view of the bonded glass plates of FIG. 1A, in which an upper one of the bonded glass plates is half cut along a plurality of half cut lines.
Figure 2B:
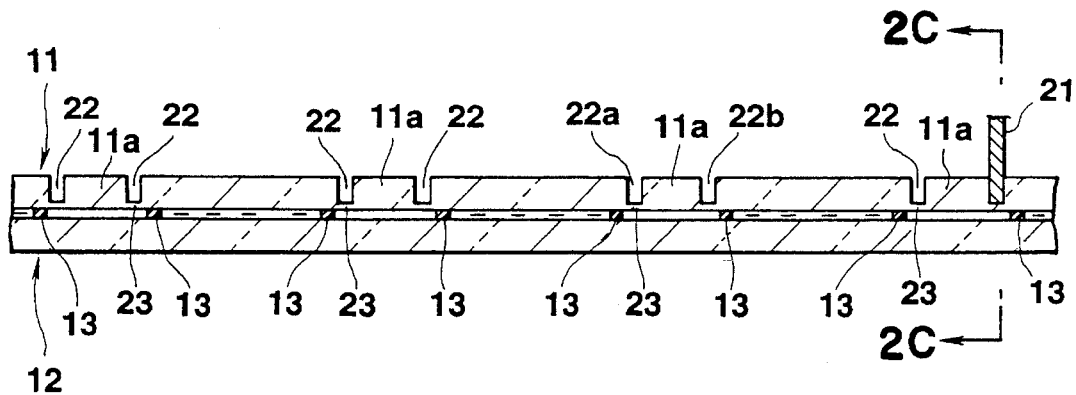
FIG. 2B is a cross sectional view of the bonded half cut glass plates, taken along a line 2B—2B of FIG. 2A.
Figure 2C:
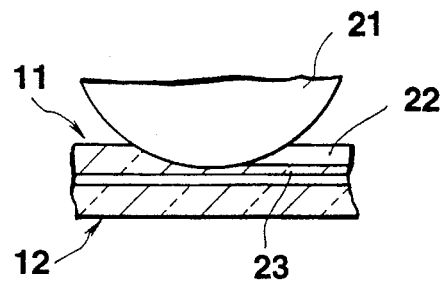
FIG. 2C is a cross sectional view of the bonded half cut glass plates, taken along a line 2C—2C of FIG. 2B.

Subsequently, as is shown in FIGS. 2A–2C, those portions of the upper glass plate 11 which are located outside of the liquid crystal filled space and are extending along width directionally extending portions of the sealing members 13 are half cut from an upper surface of the upper glass plate 11 by a rotating disk-shaped blade 21 so that the cut portions can have a remaining thickness of 30 μm–50 μm, thereby forming half-cut lines 22. Where the blade 21 has a diameter of 2 inches and a thickness of 0.25 mm, a rotational speed of the blade 21 is set to about 30,000 rpm. Further, where the blade 21 has a diameter of 4 inches and a thickness of 0.25 mm, the speed is set to about 7,500 rpm. While the cutting is performed, pure water is jetted onto the portions to be half cut, so as to cool them. Immediately before a cutting of a half-cut line 22b is finished after a half-cut line 22a adjacent to the line 22b has been finished, it is possible that those portions 11a of the glass plate located between the half-cut lines 22a and 22b are broken and scattered by the rotation of the blade 21. To prevent this, it is preferable that the thickness of each remaining portion 23 is set to as much as 70 μm–100 μm at the time of the begging and the end of cutting.

Figure 3A:
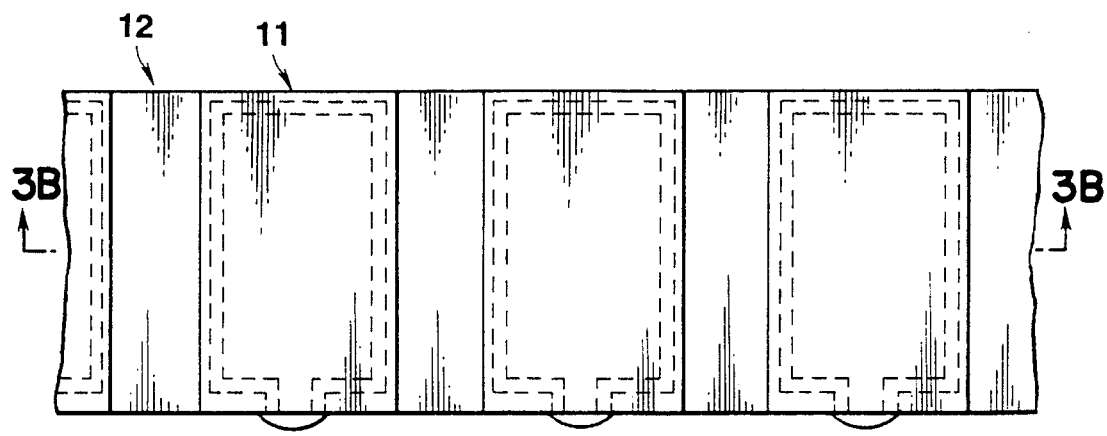
FIG. 3A is a plan view of the bonded glass plates, in which unnecessary portions are removed from the upper glass plate.
Figure 3B:
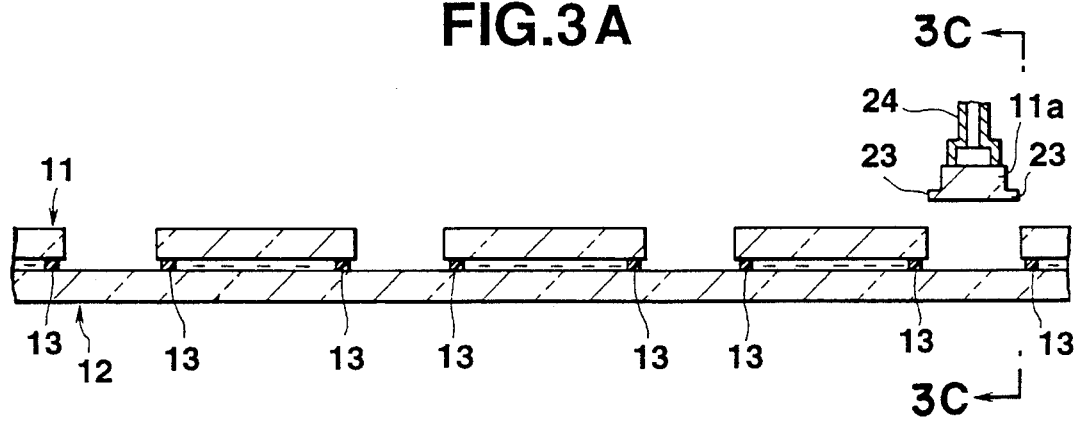
FIG. 3B is a cross sectional view of the bonded and partially removed glass plates, taken along a line 3B—3B of FIG. 3A.
Figure 3C:
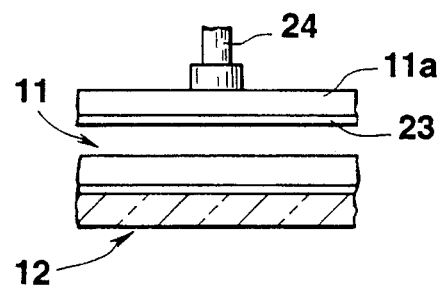
FIG. 3C is a cross sectional view of the bonded and partially removed glass plates, taken along a line 3C—3C of FIG. 3B.
Figure 4A:
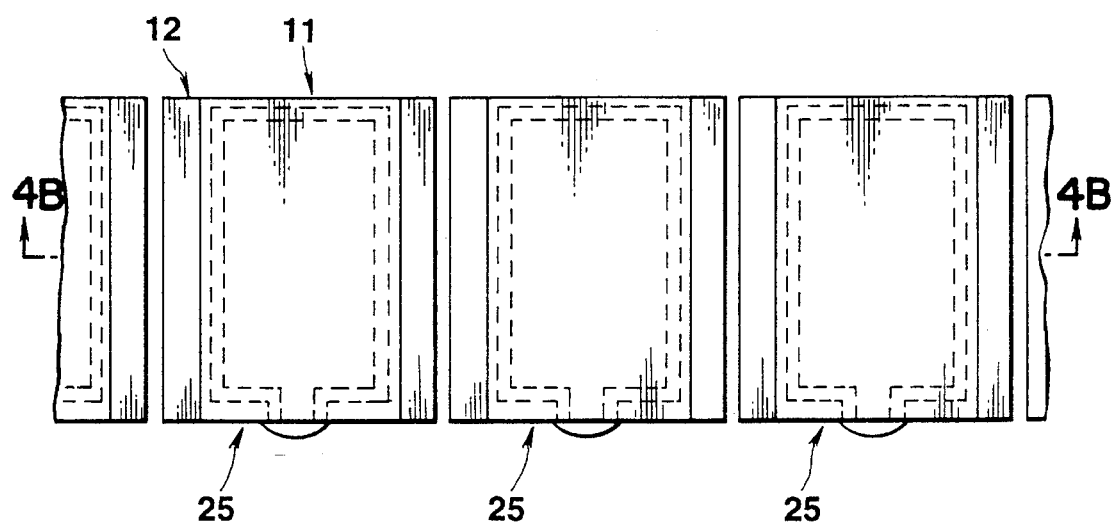
FIG. 4A is a plan view of the bonded glass plates, in which a lower glass plate is cut along a plurality of cut lines.
Figure 4B:
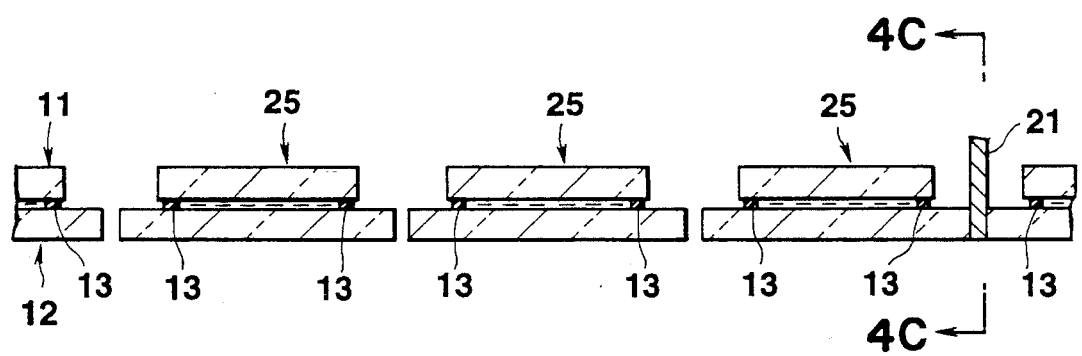
FIG. 4B is a cross sectional view of separated units of the bonded glass plates, taken along a line 4B—4B of FIG. 4A.
Figure 4C:
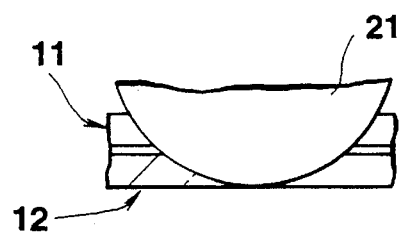
FIG. 4C is a cross sectional view of the separated units of the bonded glass plates, taken along a line 4C—4C of FIG. 4B.

Thereafter, as is shown in FIGS. 3A–3C, the unnecessary portions 11a of the upper glass plate 11 located between the half-cut lines 22a and 22b are raised by the use of a vacuum suction head 24. Thus, the unnecessary portions 11a, together with the remaining portions 23 located at the opposite ends of each unnecessary portion 11a, are cut off. As a result, each unnecessary portion 11a of the upper glass plate 11 is removed, and in other words, the upper glass plate 11 is divided into a plurality of portions. In this state, portions of the lower glass plate 12 corresponding to the removed unnecessary portions 11a are exposed. On the exposed portions of the lower glass plate 12, connecting terminals made of an ITO (Indium Tin Oxide) are formed. Then, as is shown in FIGS. 4A– 4C, a predetermined portion of each exposed portion of the lower glass plate 12 is fully cut while applying pure water to the exposed portion, thereby obtaining a plurality of liquid crystal cells 25.

In the above-described glass cutting method, the two glass plates 11 and 12 can be cut to form a plurality of liquid crystal cells 25 without being turned over. Accordingly, the glass plates 11 and 12 can automatically be cut without manual labor, reducing the manufacturing cost. Moreover, since the glass plates 11 and 12 are cut not by applying a shock but by using the blade 21, breakage of necessary portions can be prevented, thereby increasing the yield of products.

Figure 5:
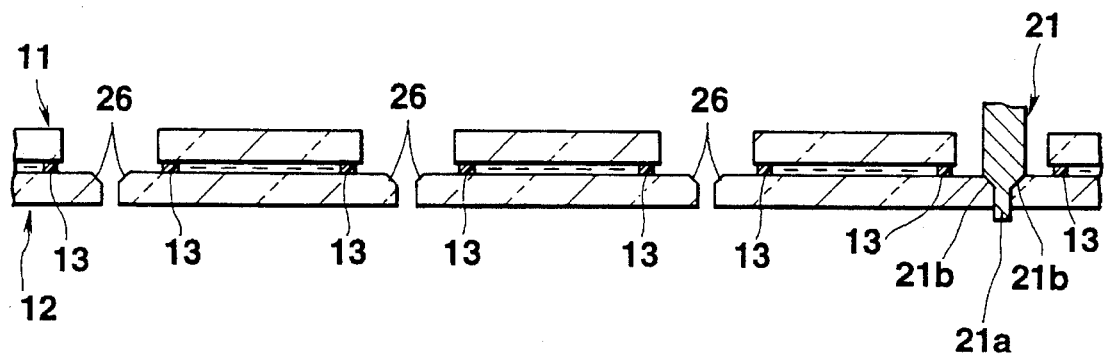
FIG. 5 is a cross sectional view of a modification of the separated units of the bonded glass plates, in which the corners of cut portions of the lower glass plate are chamfered.

FIG. 5 shows a modification of the invention.

A blade 21 employed in this modification has an outer end portion 21a formed as a straight cutting blade, and chamfering blade portions 21b extending continuous from the both side surfaces of the outer end portion 21a in a direction approaching a radial center of the blade 21 and each formed as inclined blade surface.

At the time of using the blade 21, first, the outer end portion 21a is used to half cut the upper glass plate 11, and then the vacuum suction head 24 is used to remove the cut unnecessary portions 11a of the upper glass plate 11, as in the above-described case. Subsequently, as is shown in FIG. 5, the outer end portion 21a of the blade 21 is used to cut a predetermined portion of each of the exposed portions of the lower glass plate 12, and continuously the chamfering blade portions 21b of the blade 21 are used to chamfer the edges of the cut portions of the lower glass plate 12, thereby forming chamfered portions 26.

Thus, where the edges of the cut portions of the glass plate must be chambered, the above described blade 21 is very useful since it can simultaneously perform cutting of the lower glass plate 12 and chamfering of the edges of the cut portions thereof.

Figure 6A:
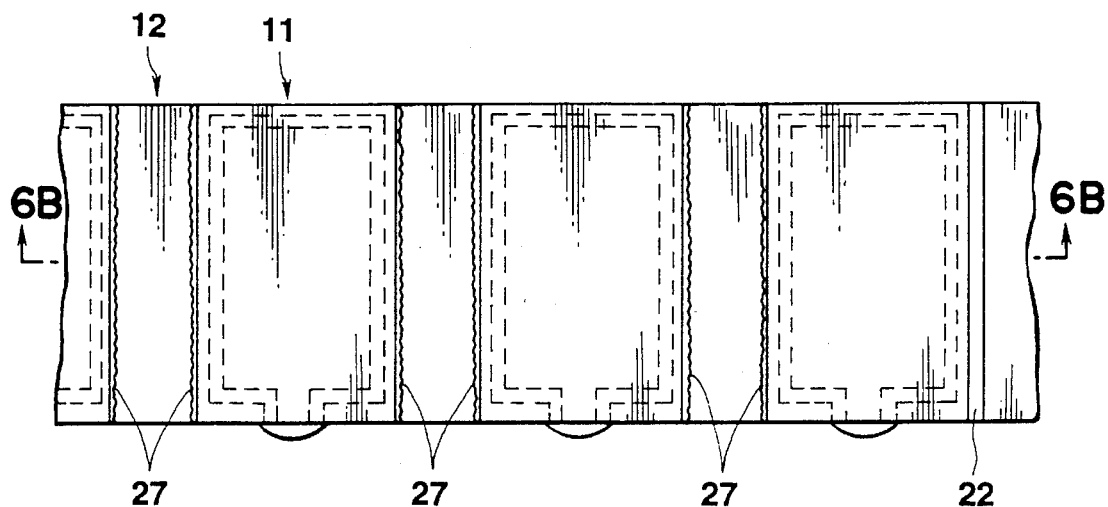
FIG. 6A is a plan view of the bonded glass plates, in which burrs remain after the unnecessary portions of the upper glass plate are removed.
Figure 6B:
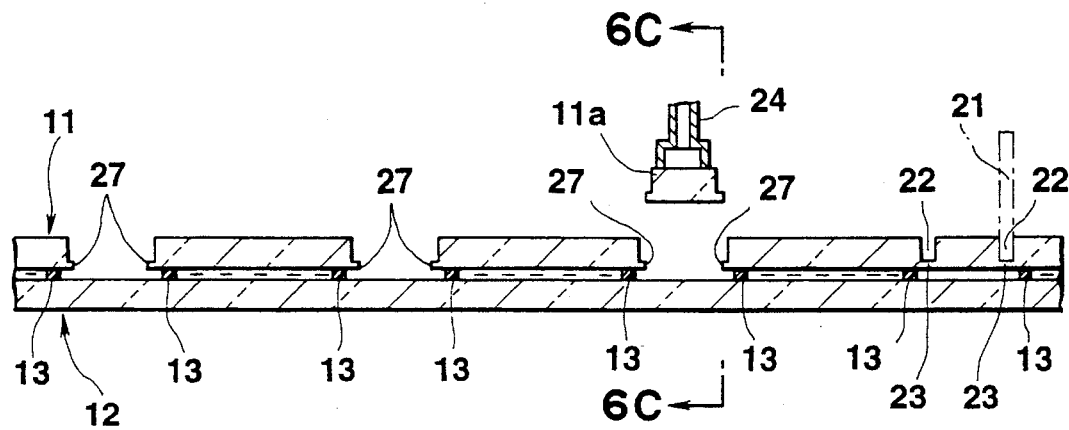
FIG. 6B is a cross sectional view of the bonded and partially removed glass plates, taken along a line 6B—6B of FIG. 6A.
Figure 6C:
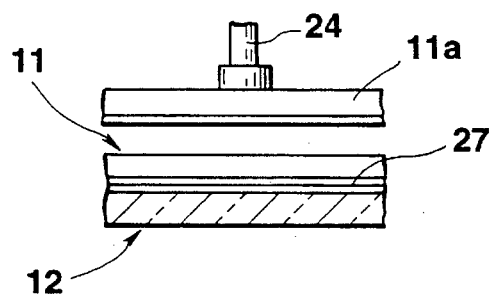
FIG. 6C is a cross sectional view of the bonded and partially removed glass plates, taken along a line 6C—6C of FIG. 6B.

FIG. 6 shows a case where burrs 27 remain on the cut portions of the upper glass plate 11, after the plate 11 is half cut by the blade 21 and then the unnecessary portions thereof are removed with the use of the vacuum suction head 24.

Figure 7:
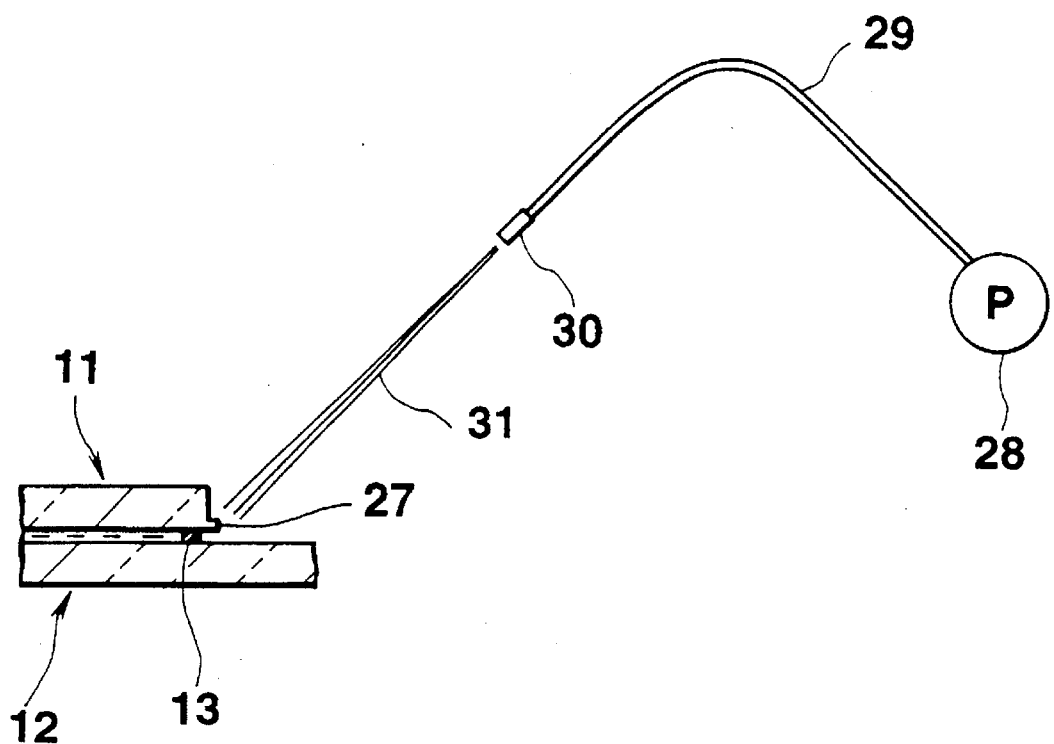
FIG. 7 schematically shows a burr removing method.
Figure 8A:
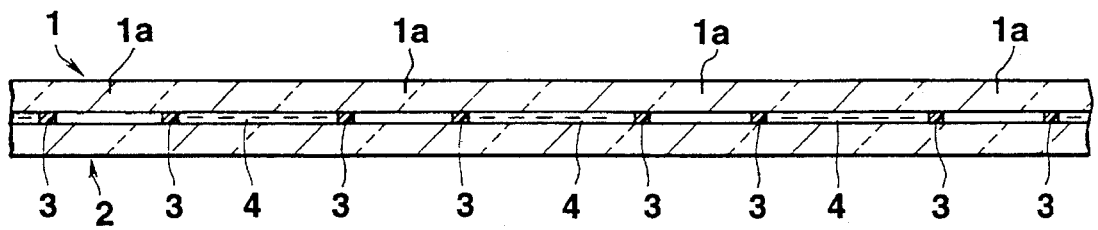
FIGS. 8A, 8B, 8C, 8D and 8E are cross sectional views of bonded two glass plates in a plurality of steps of a conventional manufacturing method of a liquid crystal display device.
Figure 8B:
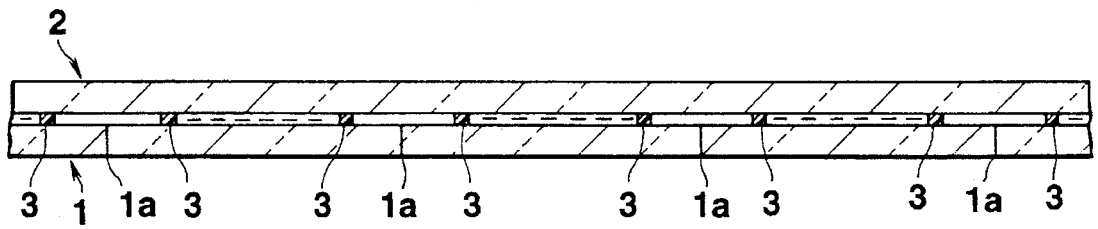
Figure 8C:
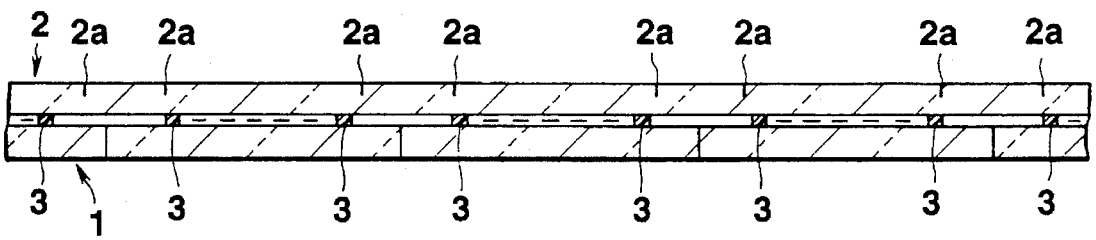
Figure 8D:
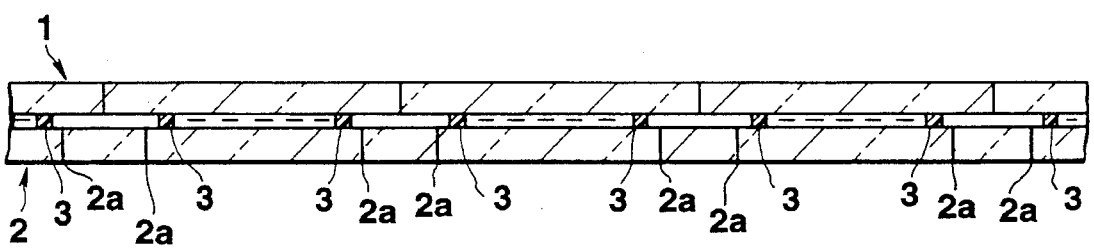
Figure 8E:
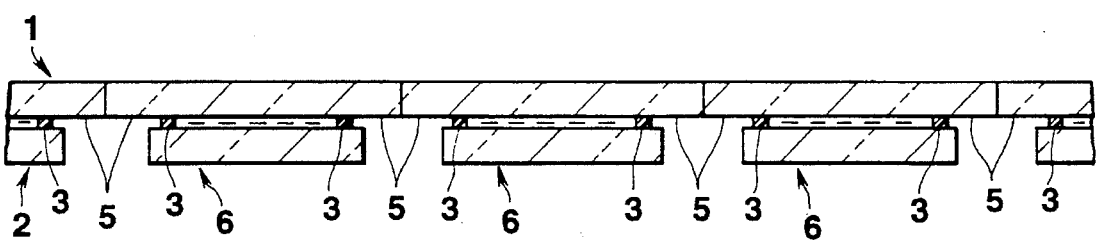

In this case, as shown in FIG. 7, pure water 31 under a pressure of 50 kg/cm$^2$–100 kg/cm$^2$ (i.e., a high pressurized jet stream of water) is obliquely jetted onto the burrs remaining on the upper glass plate 11, from a position located above and detached in side from the burrs through an injection nozzle 30 connected to a pump 28 via a tube 29. As a result of this, the burrs 27 are instantaneously removed from the upper glass plate 11.

As described above, the burrs remaining on the upper glass plate 11 can easily and reliably removed by simple means.

Although in the above described embodiment and modification, the lower glass plate 12 is cut with the use of the blade 21 after the upper glass plate 11 has been cut, the invention is not limited to this. For example, the invention may be modified such that after marking lines are scribed in the lower surface of the lower glass plate 12 and the plate 12 is cut along the marking lines by applying a shock to the bonded glass plates 11, 12 from the upward of the upper glass plate 11, the upper glass plate 11 is half cut with the blade 21 as described above. In this case, it is required to turn over the bonded two glass plates 11 and 12 only one time.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a liquid crystal display device, comprising the steps of:

arranging two substrates opposed to each other, and bonding the two substrates to each other with sealing members interposed therebetween so as to form therebetween plural spaces defined by the two substrates and the sealing members, the spaces being surrounded by the sealing members;

injecting liquid crystal into the spaces formed between the substrates and surrounded by the sealing members;

forming at least two half cut lines in a part of one of the substrates, said part in which the half cut lines are formed not being used to form said spaces; and removing a portion of said one substrate between the half cut lines formed therein and exposing a portion of the other substrate which is opposed to the removed portion by a suction head means.

2. The method according to claim 1, further comprising the step of removing burrs, if any exist, from cut surfaces of said one substrate after said removing of the portion of said one substrate therefrom.

3. The method according to claim 2, further comprising the step of cutting a predetermined portion of the exposed portion of the other substrate.

4. The method according to claim 3, wherein in the step of cutting the other substrate, the cut edges of the other substrate are simultaneously chamfered.

5. The method according to claim 4, wherein the step of removing burrs from said one substrate, comprising jetting a stream of water onto the burrs.

6. The method according to claim 3, wherein the step of removing burrs from said one substrate, comprising jetting a stream of water onto the burrs.

7. The method according to claim 2, wherein the step of removing burrs from said one substrate, comprising jetting a stream of water onto the burrs.

8. The method according to claim 1, further comprising the step of cutting a predetermined portion of the exposed portion of the other substrate.

9. The method according to claim 8, wherein in the step of cutting the other substrate, the cut edges of the other substrate are simultaneously chamfered.

* * * * *